United States Patent
Lang et al.

(10) Patent No.: US 8,352,135 B2
(45) Date of Patent: Jan. 8, 2013

(54) METHOD FOR OPERATING A HYBRID DRIVE TRAIN OF A MOTOR VEHICLE

(75) Inventors: Jürgen Lang, Backnang (DE); Klaus Riedl, Tübingen (DE)

(73) Assignee: Daimler AG, Stuttgart (DE)

( * ) Notice: Subject to any disclaimer, the term of this patent is extended or adjusted under 35 U.S.C. 154(b) by 1295 days.

(21) Appl. No.: 12/070,390

(22) Filed: Feb. 15, 2008

(65) Prior Publication Data
US 2008/0189018 A1 Aug. 7, 2008

Related U.S. Application Data

(63) Continuation-in-part of application No. PCT/EP2006/007088, filed on Jul. 19, 2006.

(30) Foreign Application Priority Data

Aug. 20, 2005 (DE) .......................... 10 2005 039 461

(51) Int. Cl.
*G06F 7/00* (2006.01)
*G06F 17/00* (2006.01)
*G06F 19/00* (2006.01)

(52) U.S. Cl. ................. 701/54; 701/51; 701/56; 701/67

(58) Field of Classification Search .................... 701/53, 701/54, 55, 51, 56, 65, 67; 180/65.21, 65.22, 180/65.225, 65.23, 65.235, 65.24, 65.245, 180/65.25, 65.26, 65.275; 475/2, 4, 5, 81, 475/151, 153, 249, 269, 271, 293; 192/30 R, 192/31, 48.1, 48.2, 48.3, 48.4, 48.7, 48.8, 192/48.9, 3.51, 3.52

See application file for complete search history.

(56) References Cited

U.S. PATENT DOCUMENTS

| | | | | |
|---|---|---|---|---|
| 3,888,325 A * | 6/1975 | Reinbeck | ................... | 180/65.25 |
| 4,867,011 A * | 9/1989 | Garrett | ........................... | 475/54 |
| 5,947,855 A * | 9/1999 | Weiss | ............................... | 475/5 |
| 6,038,500 A * | 3/2000 | Weiss | ............................... | 701/22 |
| 6,638,193 B2 * | 10/2003 | Hamai | ............................ | 475/5 |
| 6,691,808 B2 * | 2/2004 | Stenvall et al. | ............ | 180/65.25 |
| 7,129,593 B2 * | 10/2006 | King et al. | ................... | 290/4 C |
| 7,244,208 B2 * | 7/2007 | Bauknecht et al. | ............... | 475/5 |
| 7,500,929 B2 * | 3/2009 | Menne et al. | ..................... | 475/5 |
| 7,527,573 B2 * | 5/2009 | Lang et al. | ........................ | 475/5 |

(Continued)

FOREIGN PATENT DOCUMENTS

DE 295 02 906.4 6/1995

(Continued)

*Primary Examiner* — Khoi Tran
*Assistant Examiner* — Nicholas Kiswanto
(74) *Attorney, Agent, or Firm* — Klaus J. Bach

(57) ABSTRACT

In a method of operating a hybrid drive train for a motor vehicle including an internal combustion engine, an electric machine and a transmission, a first clutch arranged between the internal combustion engine and the transmission and the electric machine being arranged in parallel with the first clutch and being connectable to the internal combustion engine by way of a second clutch and to the transmission via a third clutch, the electric machine is connected by means of the second and third clutches to the internal combustion engine and to the transmission for assisting the first clutch transmitting an excessive engine torque, and upon failure of the first clutch, for starting movement of the motor vehicle, the third clutch is engaged and the electric machine is energized for transferring an electric machine torque to the transmission and the second clutch is engaged when the vehicle has reached a speed corresponding to the engine speed.

2 Claims, 2 Drawing Sheets

U.S. PATENT DOCUMENTS

2003/0199352 A1* 10/2003 Tsai et al. .................. 475/5
2008/0121447 A1* 5/2008 Lang et al. .................. 180/65.2

FOREIGN PATENT DOCUMENTS

| DE | 101 55 070 | 10/2002 |
|---|---|---|
| DE | 102 19 080 | 11/2003 |
| DE | 103 19 880 | 11/2004 |
| DE | 103 46 640 | 5/2005 |
| DE | 10 2005 022 011 | 12/2005 |
| EP | 0 812 720 | 12/1997 |
| EP | 0 864 457 | 9/1998 |
| EP | 1 116 618 | 7/2001 |
| FR | 2 833 538 | 6/2003 |

* cited by examiner

| Gang | KC | KS | KB | BS | BC |
|------|----|----|----|----|----|
| 1    |    |    | •  | •  |    |
| 2    |    |    | •  |    | •  |
| 3    | •  |    | •  |    |    |
| 4    |    | •  | •  |    |    |
| 5    | •  | •  |    |    |    |
| 6    |    | •  |    |    | •  |
| R    | •  |    |    | •  |    |

| Gang | K1 | K2 | K3 | B1 | B2 | B3 | BR |
|---|---|---|---|---|---|---|---|
| 1 |  |  | • |  | • | • |  |
| 2 |  |  | • | • | • |  |  |
| 3 | • |  | • |  | • |  |  |
| 4 | • | • |  |  | • |  |  |
| 5 | • | • | • |  |  |  |  |
| 6 |  | • | • | • |  |  |  |
| 7 |  | • | • |  |  | • |  |
| R |  |  | • |  |  | • | • |

METHOD FOR OPERATING A HYBRID DRIVE TRAIN OF A MOTOR VEHICLE

This is a Continuation-in-Part application of pending international patent application PCT/EP2006/007088 filed Jul. 19, 2006 and claiming the priority of German patent application 10 2005 039 461.2 filed Aug. 20, 2005.

BACKGROUND OF THE INVENTION

The invention relates to a method of operating a hybrid drive train of a motor vehicle having an internal combustion engine connectable, via a first clutch, to a transmission and an electric machine which can be connected to the internal combustion engine via a second clutch and, via a third clutch, to the transmission without interposition of the first clutch.

DE 103 19 880 A1 describes a hybrid drive train of a motor vehicle in which a first clutch in the form of a wet starting clutch is arranged between an internal combustion engine and a transmission in the form of an automatic transmission. The drive train has a first electric machine which is directly connected for rotation with an output shaft of the internal combustion engine. The drive train also has a second electric machine. The second electric machine can be connected by means of a clutch to a ring gear of an input planetary gear set of the automatic transmission, to which the internal combustion engine can also be connected by means of the starting clutch. In addition, the second electric machine can be connected by means of a further clutch to a sun gear of the input planetary gear set. The first electric machine is thereby fixedly connected to the internal combustion engine, and the second electric machine can be connected to the transmission without the interposition of the starting clutch. A plurality of different operating modes can be implemented using said drive train.

It is the object of the present invention to provide a method of operating a hybrid drive train of a motor vehicle in a cost-effective and reliable manner selectively by the internal combustion engine or an electric machine or both, or driving the electric machine selectively by the engine or the vehicle depending on different operating modes.

SUMMARY OF THE INVENTION

In a method of operating a hybrid drive train for a motor vehicle including an internal combustion engine, an electric machine and a transmission, a first clutch arranged between the internal combustion engine and the transmission and the electric machine being arranged in parallel with the first clutch and being connectable to the internal combustion engine by way of a second clutch and to the transmission via a third clutch, the electric machine is connected by means of the second and third clutches to the internal combustion engine and to the transmission for assisting the first clutch transmitting an excessive engine torque, and upon failure of the first clutch, for starting movement of the motor vehicle, the third clutch is engaged and the electric machine is energized for transferring an electric machine torque to the transmission and the second clutch is engaged when the vehicle has reached a speed corresponding to the engine speed.

A drive train including an internal combustion engine connected, via a first clutch, to a transmission for driving the wheels of a motor vehicle, as used in connection with the method according to the invention, includes an electric machine which can be connected by means of a second clutch to the internal combustion engine without the interposition of the first clutch, and can be connected by means of a third clutch to the transmission without the interposition of the first clutch. Herein, the electric machine can be operated as a generator and charge a battery of the motor vehicle. The electric machine can likewise be operated as an electric motor and impart a torque to the engine or to the transmission. In this case, the electric machine is supplied with energy from the battery of the motor vehicle. The electric machine is the only electric machine associated with the drive train for delivering a torque to the drive train for driving the motor vehicle or to the engine for starting the engine.

By selective coupling of the electric machine to the internal combustion engine and/or to the transmission, it is possible to implement a variety of operating modes using only a single electric machine:

When the second clutch is closed and the first and third clutches are open, a start of the internal combustion engine by means of the electric machine is possible without feedback to the rest of the drive train. In addition, in said position of the clutches, the internal combustion engine can drive the electric machine without feedback to the rest of the drive train. The electric machine is thereby operated as a generator and can generate sufficient energy for the electric power consumers of the motor vehicle.

When the third clutch is closed and the first and second clutches are open, the motor vehicle can be driven by the electric machine alone without it being necessary for the internal combustion engine to be dragged along.

In addition, in the so-called recuperation mode, the electric machine can be driven by means of the vehicle wheels and the transmission and can thereby be operated as a generator without it being necessary for the internal combustion engine to be dragged along. An optimum level of recuperation efficiency is thereby permitted.

Without the possibilities provided by the invention for coupling the electric machine to the internal combustion engine and/or to the transmission, at least two electric machines would be necessary in order to implement said operating modes.

In addition to the clutch positions described, it is also possible for the second and third clutches to be closed at the same time. A part of the torque output of the internal combustion engine can thereby be transmitted to the transmission via the second clutch, the electric machine and the third clutch. The first clutch is thereby assisted, so that the internal combustion engine can output more torque than can be transmitted by the first clutch alone. This protects the first clutch from overloads and therefore from excessive wear or damage. In addition, for accelerating the motor vehicle, a higher torque can be transmitted to the transmission, and therefore to the driven vehicle wheels, than can be transmitted via of the first clutch alone, particularly if the electric machine is at the same time energized.

In addition, the second and the third clutch can also be closed in the event of a fault being detected in the first clutch in the driving mode, for example if the first clutch can no longer close and therefore torque can no longer be transmitted by means of the first clutch. In this case, the torque of the internal combustion engine can be transmitted to the transmission via the second clutch, the electric machine and the third clutch. The motor vehicle is therefore at least partially operational even in the event of a failure of the first clutch. In this context, a driving mode is to be understood to mean that the speed of the vehicle is high enough so that, when the second and third clutches are closed, the rotational speed of the internal combustion engine is greater than a minimum rotational speed, for example an engine idling speed.

In order to start moving the vehicle in the event of a fault being detected in the first clutch, that is to say in order to attain said driving mode, the torque required for this purpose can be imparted by the electric machine and transmitted via the third clutch to the transmission. For this purpose, the electric machine is separated from the internal combustion engine by disengaging the second clutch. Movement of the motor vehicle can then be initiated even in the event of a failure of the first clutch.

The first clutch is preferably a starting clutch, for example a wet-running multiplate plate clutch. This has the advantage that no further starting element, such as for example a hydrodynamic torque converter, needs to be provided. This would take up additional installation space and would make the drive train more expensive and heavier.

In one embodiment of the invention, the transmission is an automatic transmission with an input-side summing gearing. The summing gearing is in particular a planetary gear set. The electric machine can thereby be connected either to that element of the summing gearing which can also be connected, by means of the first clutch, to the internal combustion engine, or to some other element. If the electric machine is connected to some element other than the internal combustion engine, then the rotational speeds of the internal combustion engine and the electric machine are superposed in the summing gearing and continuously variable operation of the drive train is made possible by controlling the speed of the electric machine as disclosed for example in DE 103 19 880 A1, which is assigned to the assignee of the present invention.

For the purpose of coupling the electric machine to the transmission, a clutch can be provided, by means of which the electric machine can be connected to an element of the input-side summing gearing. It is likewise possible for two clutches to be provided for the alternative connection of the electric machine to in each case one element of the input-side summing gearing.

The invention will become more readily apparent from the following description of exemplary embodiments thereof illustrated in simplified form in the accompanying drawings:

DESCRIPTION OF THE PREFERRED EMBODIMENT

Figures 1, 2:
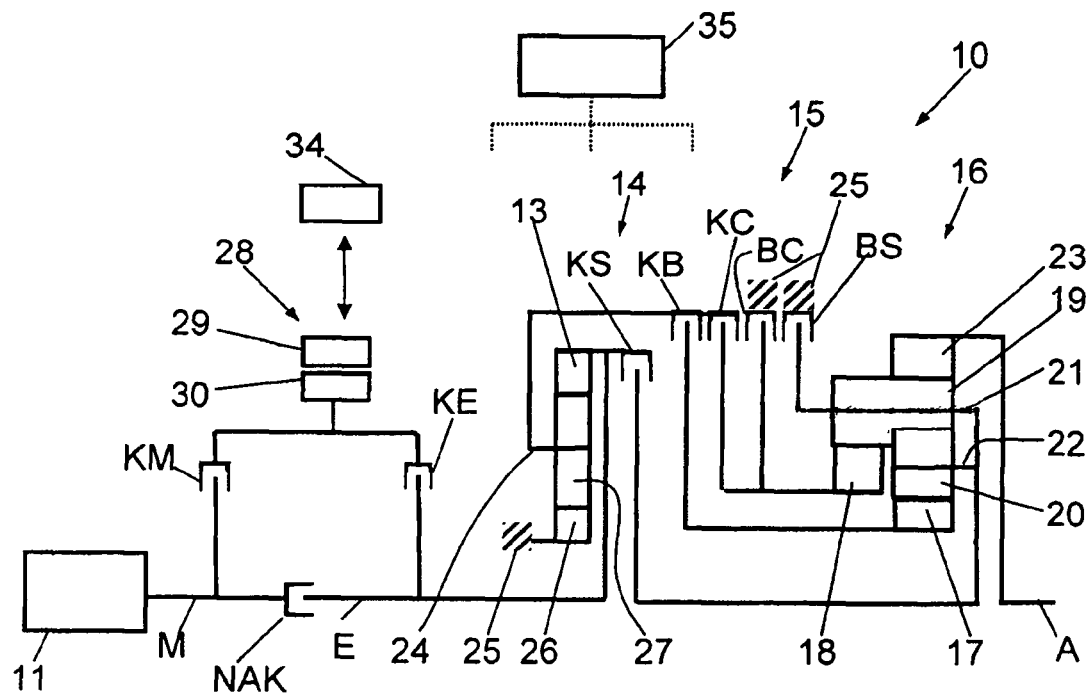
FIG. 1 shows schematically a hybrid drive train of a motor vehicle having an internal combustion engine, an electric machine and a transmission.
FIG. 2 shows a table for the activation of the transmission clutches and brakes in the individual gears of the transmission of FIG. 1.

As shown in FIG. 1, a hybrid drive train 10 of a motor vehicle has an internal combustion engine 11 which is connected, by means of an engine shaft M, a starting element in the form of a wet starting clutch NAK (first clutch) and a transmission input shaft E, to a ring gear 13 of an input side summing gearing in the form of an input-side planetary gear set 14 of a transmission 15. In addition to the input-side planetary gear set 14, the transmission 15 has an output-side planetary gear set in the form of a Ravigneaux planetary gear set 16. The Ravigneaux planetary gear set 16 has a small sun gear 17, a large sun gear 18, a wide planet gear 19, a narrow planet gear 20 with associated planet gear carriers 21, 22 and a ring gear 23, with the wide planet gear 19 meshing with the large sun gear 18 and the ring gear 23, and the narrow planet gear 20 meshing with the small sun gear 17 and the wide planet gear 19. The planet gear carriers 21 and 22 are coupled to one another. The ring gear 23 is connected to an output shaft A which is connected by means of a differential gearing (not illustrated) to vehicle wheels (not illustrated).

The ring gear 13 of the input-side planetary gear set 14 can be connected by means of a first transmission clutch KS to the planet gear carriers 21, 22 of the Ravigneaux planetary gear set 16. A planet gear carrier 24 of the input-side planetary gear set 14 can be connected by means of a second transmission clutch KB to the small sun gear 17 of the Ravigneaux planetary gear set 16 and by means of a third transmission clutch KC to the large sun gear 18 of the Ravigneaux planetary gear set 16. The large sun gear 18 of the Ravigneaux planetary gear set 16 can be fixed with respect to a housing 25 by means of a second brake BC, and the planet gear carriers 21, 22 can be fixed with respect to said housing 25 by means of a third brake BS.

A sun gear 26 of the input-side planetary gear set 14 is fixed with respect to the housing 25. The input-side planetary gear set 14 also has a planet gear 27 which is mounted on the planet gear carrier 24 and which meshes with the sun gear 26 and the ring gear 13.

The drive train 10 has an electric machine 28 with a stator 29 which is fixed with respect to the housing and which interacts with a rotor 30 in order to generate a drive torque and/or, in order to recuperate electrical energy. The rotor 30 can be connected by means of a second clutch KM to the engine shaft M and by means of a third clutch KE to the transmission input shaft E of the transmission 15.

The electric machine 28 is connected to a battery 34. The battery 34 supplies the electric machine 28 with electrical energy for the generation of a drive torque, and accumulates electrical energy if the electric machine is operated in the recuperation mode, that is to say as a generator.

The internal combustion engine 11, the starting clutch NAK, the transmission 15 and the electric machine 28 are activated by a control device 35. For clarity, the signal lines to said components are not illustrated.

In the transmission 15, it is possible to set six forward gears and one reverse gear by closing in each case two transmission clutches and/or brakes between the transmission input shaft E and the output shaft A.

The table illustrated in FIG. 2 shows the transmission clutches and brakes which are closed for each gear:

$1^{st}$ Gear:

In the $1^{st}$ gear, the transmission clutch KB and the brake BS are closed. The drive therefore takes place via the ring gear 13 and the planet gear carrier 24 to the small sun gear 17. Since the planet gear carriers 21 and 22 are fixed by means of the brake BS, the ring gear 23 and therefore the output shaft A are driven via the narrow planet gear 20 and the wide planet gear 19.

$2^{nd}$ Gear:

In $2^{nd}$ gear, the transmission clutch KB and the brake BC are closed. The drive therefore takes place via the ring gear 13 and the planet gear carrier 24 to the small sun gear 17. The large sun gear 18 is stationary, so that the planet gear carriers 21 and 22 rotate, and the drive thus takes place to the ring gear 23.

$3^{rd}$ Gear:

In $3^{rd}$ gear, the transmission clutches KB and KC are closed. The drive therefore takes place via the ring gear 13 and the planet gear carrier 24 to the small sun gear 17 and the large sun gear 18. The Ravigneaux planetary gear set 16 thereby rotates as a block.

4$^{th}$ Gear:

In 4$^{th}$ gear, the transmission clutches KS and KB are closed. The drive therefore takes place both via the ring gear 13 and the planet gear carrier 24 to the small sun gear 17, and also directly to the planet gear carriers 21 and 22.

5$^{th}$ Gear:

In 5$^{th}$ gear, the transmission clutches KC and KS are closed. The drive therefore takes place both via the ring gear 13 and the planet gear carrier 24 and the clutch KC to the large sun gear 18 and also via the clutch KS directly to the planet gear carriers 21 and 22.

6$^{th}$ Gear:

In 6$^{th}$ gear, the transmission clutch KS and the brake BC are closed. The drive therefore takes place directly to the planet gear carriers 21 and 22. The large sun gear 18 is stationary, so that the planet gear carriers 21 and 22 rotate and the drive thus takes place to the ring gear 23.

Reverse Gear:

In reverse gear, the transmission clutch KC and the brake BS are closed. The drive therefore takes place via the ring gear 13 and the planet gear carrier 24 to the large sun gear 18. The planet gear carriers 21 and 22 are stationary, so that the ring gear 23 is driven by the wide planet gear 19, with a reversal of the rotational direction of the ring gear 23 and the output shaft A.

Figures 3, 4:
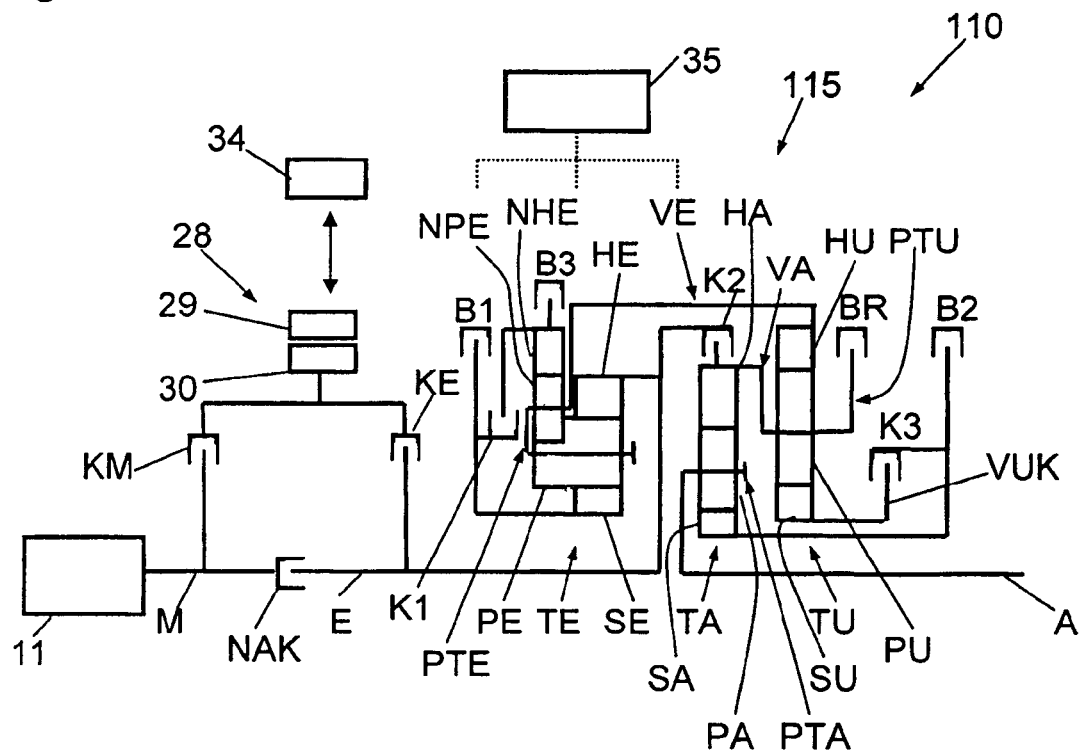
FIG. 3 shows schematically a hybrid drive train of a motor vehicle in a second embodiment.
FIG. 4 shows a table for the activation of the transmission clutches and brakes in the individual gears of the transmission of FIG. 3.

A hybrid drive train 110 as shown in FIG. 3 differs from the drive train 10 shown in FIG. 1 merely in the construction of the transmission 115. For this reason, only the construction of the transmission 115 is discussed below.

An input-side summing gearing in the form of a component planetary gear set TE has a planet gear carrier PTE which serves to rotatably support planet gears PE. An outer central ring gear HE meshes with the planet gears PE. The outer central ring gear HE is rotationally fixed to the transmission input shaft E. An inner central sun gear SE also meshes with the planet gears PE, which inner central gear SE is connected to a frictionally engaging brake B1, which can be engaged and disengaged, and to a transmission clutch K1 which can be engaged and disengaged. An output-side component planetary gear set TA has a planet gear carrier PTA which serves to rotatably mount planet gears PA and which is provided with a rotationally fixed connection to the transmission input shaft A. An outer central ring gear HA meshes with the planet gears PA, which outer central gear HA is connected by means of a frictionally engaging transmission clutch K2, which can be engaged and disengaged, to the transmission input shaft E. An inner central sun gear SA also meshes with the planet gears PA, which inner central sun gear SA is connected to a brake B2 which can be engaged and disengaged.

A reversal component planetary gear set TU has a planet gear carrier PTU which serves to rotatably mount planet gears PU, which planet gear carrier PTU is connected to a friction brake BR, which can be engaged and disengaged, and is provided with a rotationally fixed drive connection VA to the outer central ring gear HA of the output-side component transmission TA. An outer central ring gear HU meshes with the planet gears PU, which outer central ring gear HU has a drive connection VE to the planet gear carrier PTE of the input-side component transmission TE. An inner central sun gear SU also meshes with the planet gears PU.

Provided between the two inner central sun gears SA and SU is a drive connection VUK, which can be disconnected by means of a frictional transmission clutch K3 that can be engaged and disengaged.

Auxiliary planet gears NPE are additionally rotatably mounted on the planet gear carrier PTE, which auxiliary planet gears NPE mesh both with the planet gears PE and also with an outer auxiliary central ring gear NHE connected to a friction brake B3 which can be engaged and disengaged.

The table illustrated in FIG. 4 shows the transmission clutches and brakes which are closed for each gear:

1$^{st}$ Gear:

The brake B2 and the transmission clutch K3 are engaged, as a result of which both component transmissions TA and TU are shifted into a static transmission ratio with a securely braked reaction element—central sun gears SA and SU—and are connected in series in the force flow. This also applies to the input-side component transmission TE, but in the latter case, the static transmission ratio with the auxiliary central ring gear NHE locked (by means of the engaged brake B3), is higher than the transmission ratio obtained when the central sun gear SE is securely braked.

2$^{nd}$ Gear:

All three component transmissions TE, TA and TU are shifted into their stationary transmission ratio with a securely braked reaction element—central sun gears SE, SA and SU—and are connected in series with regard to the force flow, so that here the gear transmission ratio for the 2$^{nd}$ gear is determined by multiplicative combination of said three component transmission ratios.

3$^{rd}$ Gear:

The input-side component transmission TE is, by means of the transmission clutch K1, shifted into its component transmission ratio 1:1 and is connected as a block in series with the component transmissions TA and TU in the force flow, which component transmissions TA and TU, as a result of the engaged state of the brake B2 and of the transmission clutch K3, are in each case in their stationary transmission ratio with a securely braked reaction element (central sun gear SA and SU respectively) and are connected in series with one another in the force flow. Accordingly, the gear transmission ratio is determined in this case by the multiplicative combination of the stationary transmission ratios of the two component transmissions TA and TU.

4$^{th}$ Gear:

As a result of the in each case engaged state of the transmission clutches K1 and K2 and of the brake B2, the component transmissions TE and TU are shifted into their respective transmission ratio 1:1 and the output-side component transmission TA is shifted into its stationary trans-mission ratio with a securely braked reaction element, so that the gear transmission ratio is determined solely by the stationary transmission ratio of the output-side component transmission TA.

5$^{th}$ Gear:

The three transmission clutches K1, K2 and K3 are engaged, so that all three component transmissions TE, TA and TU rotate as a common block, and the 5$^{th}$ gear is consequently represents as a direct gear.

6$^{th}$ Gear:

The brake B1 and the transmission clutches K2 and K3 are engaged, as a result of which all three component transmissions TE, TA and TU are connected to one another, so as to form a coupled transmission, with securely braked central sun gear SE, which steps up the drive of the central gears SA and SU to a greater degree, and respectively steps up the drive of the output shaft A to a lesser degree, compared to the input shaft E.

7$^{th}$ Gear:

The brake B3 and the transmission clutches K2 and K3 are engaged, so that all three component transmissions TE, TA and TU are connected to form a single coupled transmission in which the securely braked auxiliary central ring gear NHE steps up to an even greater degree the drive of the rotationally fixedly coupled central sun gears SA and SU, and to a lesser degree steps up the drive of the output shaft A, in each case compared to the input shaft E.

Reverse Gear R:

The brakes B3 and BR and the transmission clutch K3 are engaged. Accordingly, the two component transmissions TA and TU are connected to one another so as to form a coupled transmission with securely braked planet carrier PTU as a reaction element. Connected upstream of the carrier PTU in series in the force flow is the input-side component transmission TE which is in a stationary transmission ratio with securely braked reaction element NHE. The engaged brake BR transmits power in the opposite rotational direction to the coupled central gears SA and SU, whose rotational speed is reduced again slightly in the output-side component transmission TA for the output shaft A.

The two described drive trains 10 and 110 can similarly be operated in various operating modes:

a) Standstill of the Internal Combustion Engine when the Vehicle is Stationary or Rolling without Drive When the internal combustion engine 11 is shut down and the electric machine 28 is deactivated, the starting clutch, the first and second clutches, the transmission clutches and the brakes are open.

For a startup of the internal combustion engine 11, the latter is cranked by means of the electric machine 28 which in this case is used as an electric motor. The electric machine 28 is for this purpose connected by means of the second clutch KM to the engine shaft M. The third clutch KE is open, whereby the electric machine 28 is separated from the transmission input shaft E. Here, the starting clutch NAK is likewise open, whereby the drive connection between the engine shaft M and the drive output shaft A is interrupted.

b) Running Internal Combustion Engine when the Vehicle is Stationary or Rolling without Drive When the internal combustion engine 11 is running and the second clutch KM is closed and the starting clutch NAK is open and the third clutch KE is open, the internal combustion engine 11 drives the electric machine 28 via the engine shaft M and the second clutch KM. In this case, the electric machine 28 is operated as a generator and generates sufficient electrical energy for the consumers of the motor vehicle.

c) Conventional Operation with the Internal Combustion Engine Alone

The starting clutch NAK is closed, while the second and third clutches KM and KE are open. The electric machine 28 is therefore separated both from the engine shaft M and also from the transmission input shaft E. The position of the rest of the transmission clutches and brakes is determined from the specifications for shifting the transmission in order to realize the individual gears, see above.

d) Dual Operation of the Internal Combustion Engine with the Electric Machine

For starting and driving in gears 1 to 6 and 7 and in the reverse gear R, the rotational speed of the electric machine 28 corresponds to the rotational speed of the trans-mission input shaft E. An additional torque can be imparted to the transmission input shaft E by means of the electric machine 28. Alternatively, the electric machine 28 can be operated in the generator mode in order to recuperate energy. For all of said gears, the starting clutch NAK and the third clutch KE are closed, while the second clutch KM is open. The state of the rest of the transmission clutches and brakes is determined from the specifications for shifting the transmission in order to realize the individual gears, see above.

e) Electric Driving

When the internal combustion engine 11 is deactivated, operation of the drive train 10, 110 by means of the electric machine 28 alone can take place.

Starting and driving in gears 1 to 6 and 7 and in the reverse gear R take place by means of a suitable supply of current to the electric machine 28, with the latter delivering a drive torque. For this driving state, the starting clutch NAK and the second clutch KM are open and the third clutch KE is closed. The state of the rest of the transmission clutches and brakes is determined from the specifications for shifting the transmission in order to realize the individual gears, see above.

f) Recuperation Mode

If the motor vehicle is to be braked, the excess kinetic energy of the motor vehicle can be converted into electrical energy by the electric machine 28. For this purpose, the electric machine 28 is operated as a generator and is driven by the driven vehicle wheels via the transmission 15, 115 and the third clutch KE. For this purpose, the third clutch KE is closed and the starting clutch NAK and the second clutch KM are open. The gear in the transmission 15, 115 is selected as a function of the speed of the motor vehicle and the required braking torque. The engaged gear in the transmission 15, 115 determines the state of the rest of the transmission clutches and brakes.

g) The Output Torque of the Internal Combustion Engine Exceeds the Maximum Transmissible Torque of the Starting Clutch.

Depending on the design of the internal combustion engine 11, the maximum torque of the internal combustion engine 11 can be greater than the maximum transmissible torque of the starting clutch NAK. In order to be able to nevertheless utilize the maximum torque of the internal combustion engine 11, the starting clutch NAK can be assisted by closing the second and third clutches KM, KE. A part of the torque output by the internal combustion engine 11 thereby is transmitted via the second clutch KM, the electric machine 28 and the third clutch KE to the transmission 15, 115, whereby the part of the torque to be transmitted by the starting clutch NAK is below the maximum possible torque.

h) Operation in the Event of a Fault being Detected in the Starting Clutch

If a fault is detected in the starting clutch NAK, for example if the starting clutch NAK no longer follows the activation by the control device 35 and can therefore no longer be closed, operation of the motor vehicle by via of the second and third clutches KM, KE and the electric machine 28 is still possible.

The motor vehicle can be started by means of the electric machine 28 as described under e).

Once a minimum speed of the motor vehicle has been reached, the second clutch KM is closed, so that the torque of the internal combustion engine 11 is transmitted via the second clutch KM, the electric machine 28 and the third clutch KE to the transmission 15, 115. The motor vehicle can thereby be driven by the internal combustion engine 11 even when the starting clutch NAK fails.

By means of the above-stated different operating modes of the drive train 10, 110, it is possible in a varied manner to attain identical or comparable driving states of the motor vehicle. A selection of a suitable operating mode for a desired driving state takes place for example on the basis of a performance graph or characteristic map which contains for example efficiencies, power balances, attainable acceleration values or the like. A selection of a suitable operating mode can take place for example according to an operating strategy defined a priori. Alternatively or in addition, individual operating variables of the drive train, such as operating temperatures of the electric machine 28 or clutches, transmission clutches and brakes can be monitored, so that when a limit value of an operating temperature is exceeded, a clutch can be deactivated by changing an operating state of the drive train, so that said clutch is relieved of load.

A selection of individual operating modes takes place according to a driving strategy which is stored in particular in the control device 35. Here, the driving strategy contains in particular a selection of an operating mode according to
- a charging state of the battery 34,
- at least one environmental parameter such as a gradient, a geodetic height, a temperature or the like,
- a vehicle parameter such as for example a load state, an operating temperature or an operating duration of the drive train or of a drive unit, an operating temperature or an operational frequency or a wear state of a starting element, a clutch or a brake,
- at least one movement variable such as the vehicle speed or the vehicle acceleration,
- at least one variable which is dependent on a driver, such as a pedal actuation (acceleration request, brake pedal), a manual actuation (manual selection of different transmission programs) and/or a driver type which is determined,
- a characteristic map which contains, for example, efficiencies, power balances, attainable acceleration values or the like,
- an operating strategy which is predefined a priori, and/or
- emission values (internal combustion engine or catalytic converter cold/warm), wherein the abovementioned influencing parameters may be a current parameter, chronologically previous parameters and/or an averaged parameter.

The illustrated drive trains 10, 110 permit hybrid operation with six and seven forward gears respectively and one reverse gear being provided in addition to the hybrid operation, while ensuring high transmissible drive output torques. The starting clutch NAK can be a dry or wet clutch with partial or full starting functionality. If the starting clutch NAK is overloaded, then the latter can be relieved of load by starting by means of the electric machine 28 without said starting clutch NAK.

In addition to the described transmissions 15, 115, it is also possible for other transmission types, such as for example automated manual transmissions or continuously variable transmissions, to be used in the drive train according to the invention.

What is claimed is:

1. A method for operating a hybrid drive train of a motor vehicle, said drive train including
   an internal combustion engine (11),
   a transmission (15, 115),
   a first clutch (NAK) arranged between the internal combustion engine (11) and the transmission (15, 115), for transmitting an engine torque directly to the transmission (15, 115)
   an electric machine (28),
   means for connecting the electric machine (28) to the drive train including a second clutch (KM) for connecting the electric machine to the internal combustion engine (11) without the interposition of the first clutch (NAK), and
   a third clutch (KE) for connecting the electric machine (28) to the transmission (15, 115) without the interposition of the first clutch (NAK),
   said method comprising the steps of:
   transmitting selectively, in a high-torque driving mode, a part of the torque of the internal combustion engine (11) via the second clutch (KM), the electric machine (28) and the third clutch (KE) to the transmission (15, 115), in order to assist the first clutch (NAK)
   or in the event of a fault being detected in the first clutch (NAK),
   connecting the internal combustion engine (11) to the transmission (15, 115) by connecting the electric machine (28) by means of the second clutch (KM) to the internal combustion engine (11) and by means of the third clutch (KE) to the transmission (15, 115).

2. The method as claimed in claim 1, wherein, in the event of a fault being detected in the first clutch (NAK), a torque for starting out movement of the motor vehicle is provided by first connecting the electric machine (28) by means of the third clutch (KE) to the transmission (15, 115), energizing the electric machine to accelerate the vehicle while keeping the second clutch (KM) disengaged from the internal combustion engine, and engaging the second clutch (KM) when the vehicle has reached a speed corresponding to a momentary engine speed for transmitting engine power to the transmission.

* * * * *